United States Patent
Seeger et al.

(10) Patent No.: US 8,909,650 B2
(45) Date of Patent: Dec. 9, 2014

(54) ORDERING DATA ITEMS PERTAINING TO CONTACTS ACCORDING TO RELEVANCE OF THE CONTACTS

(75) Inventors: Jessica Seeger, Düsseldorf (DE); Matthew Stokes, Düsseldorf (DE); Bettina Wilmes, Düsseldorf (DE)

(73) Assignee: Vodafone Holding GmbH, Dusseldorf (DE)

(*) Notice: Subject to any disclaimer, the term of this patent is extended or adjusted under 35 U.S.C. 154(b) by 308 days.

(21) Appl. No.: 13/008,229

(22) Filed: Jan. 18, 2011

(65) Prior Publication Data
US 2011/0196876 A1   Aug. 11, 2011

(30) Foreign Application Priority Data
Feb. 8, 2010   (EP) .................... 10001273

(51) Int. Cl.
*G06F 17/30*   (2006.01)
*G06Q 10/10*   (2012.01)

(52) U.S. Cl.
CPC .................... *G06Q 10/10* (2013.01)
USPC ......................................... 707/748

(58) Field of Classification Search
CPC .................................... G06Q 10/10
USPC ......................... 707/748, 791, 802
See application file for complete search history.

(56) References Cited

U.S. PATENT DOCUMENTS

2009/0030940 A1* 1/2009 Brezina et al. ............ 707/103 Y
2009/0234874 A1* 9/2009 Sylvain ........................ 707/102

* cited by examiner

*Primary Examiner* — Huawen Peng
(74) *Attorney, Agent, or Firm* — International IP Law Group, PLLC

(57) ABSTRACT

There is provided a system and method for providing an ordered arrangement of data items pertaining to contacts. The order of the arrangement may be determined based on a comparison of ranks of the contacts. An exemplary method comprises registering communications between the user and the contacts. The communications may include active communications originating from the user and terminating at a contact and passive communications originating from a contact and terminating at the user. The exemplary method also comprises determining a rank of a contact based on a comparison of occurrences of the active and the passive communications between the user and the contact.

14 Claims, 2 Drawing Sheets

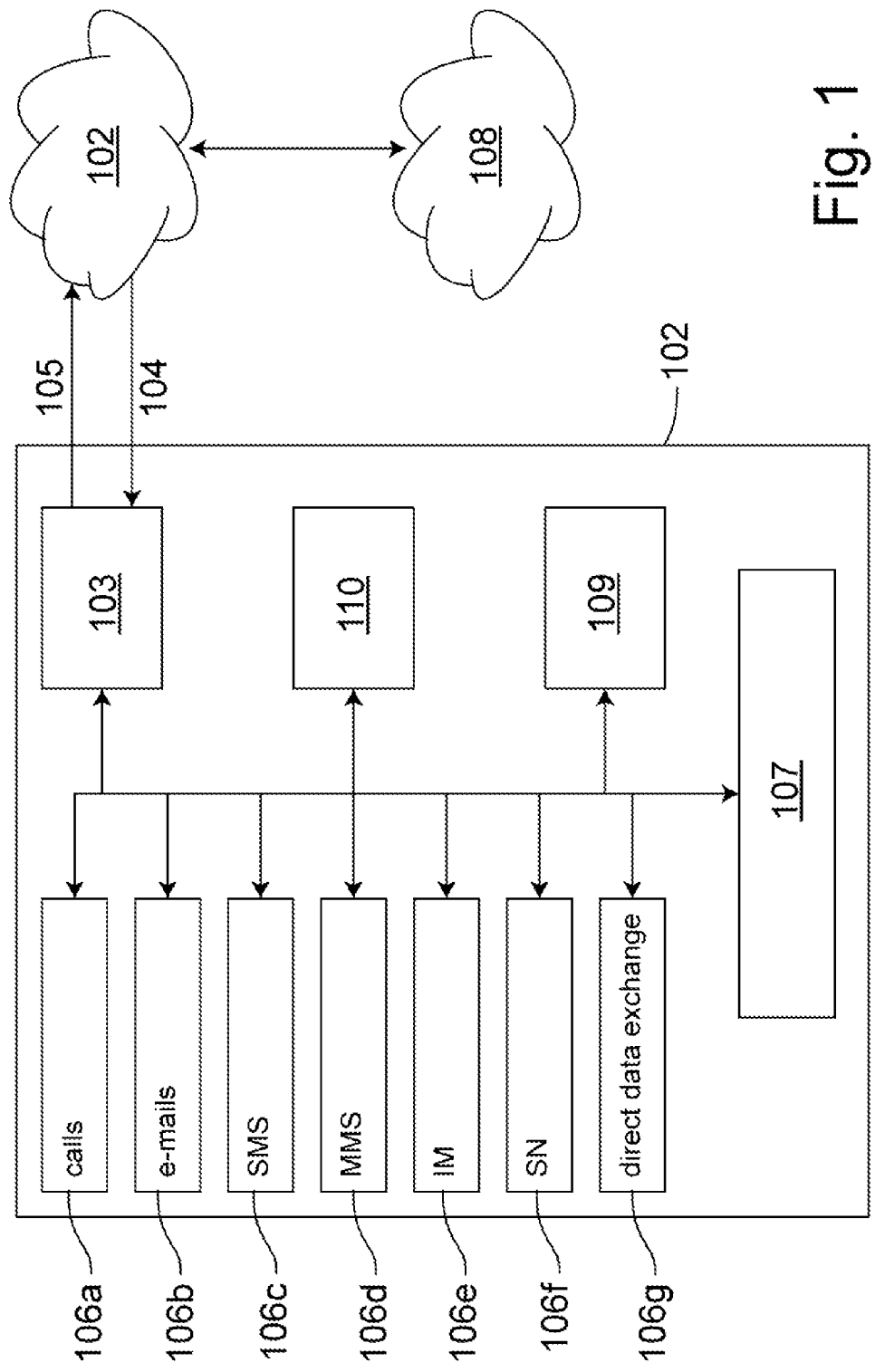

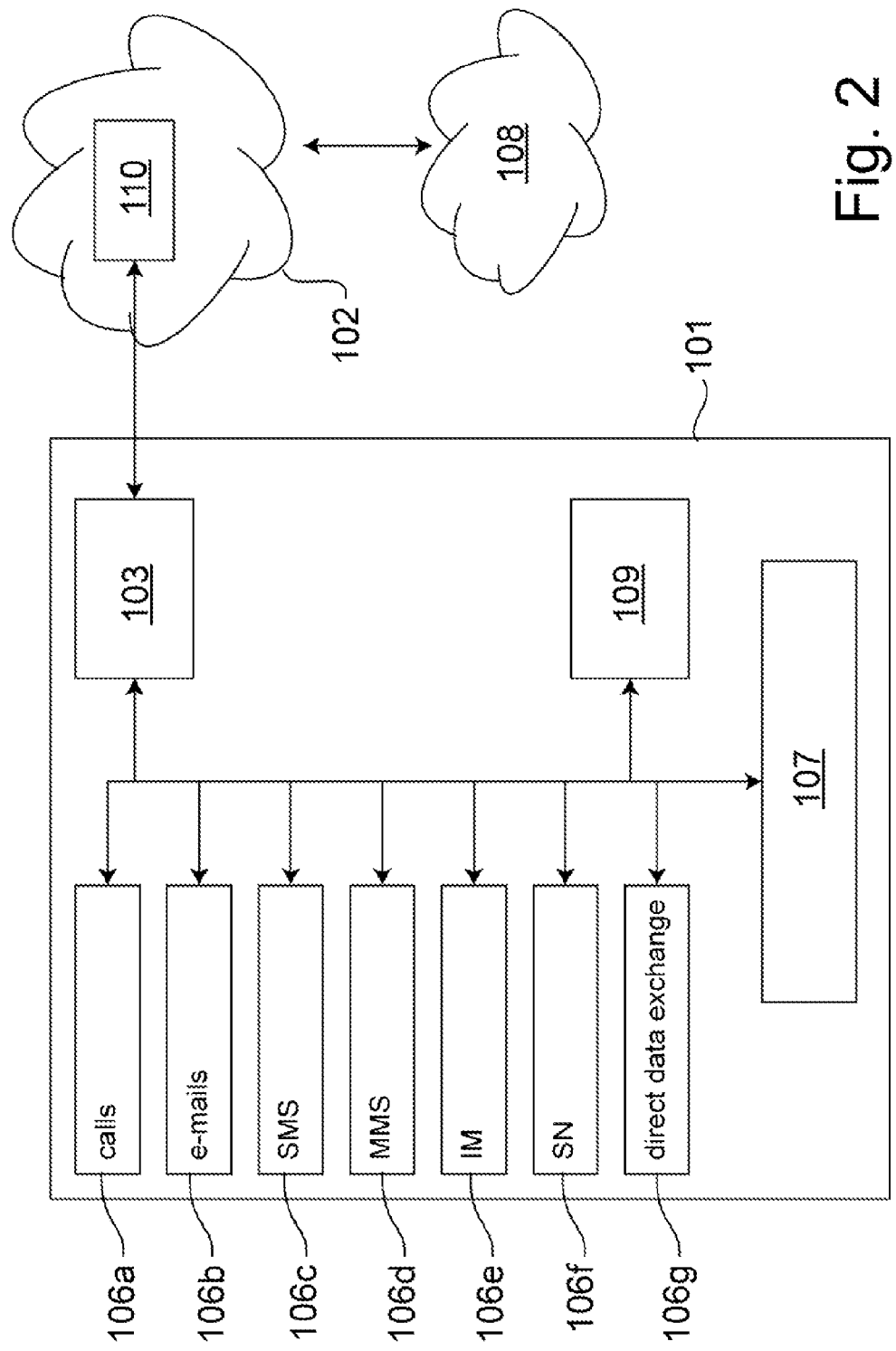

ORDERING DATA ITEMS PERTAINING TO CONTACTS ACCORDING TO RELEVANCE OF THE CONTACTS

CROSS REFERENCE TO RELATED APPLICATION

This application claims priority to European (EP) Patent Application No. 10 001 273.1, filed on Feb. 8, 2010, the contents of which are incorporated by reference as if set forth in their entirety herein.

BACKGROUND

Particularly due to the rapid growth of electronic communication, such as, for example, e-mail, instant messaging and communication through social network services, the social networks of users of communication services become more and more widespread. This leads to an increasing number of contacts of the users, i.e. persons the users communicate with and/or with whom the users know how to communicate. Usually, a user stores his contacts of in a database such as an address book in order to avoid the need to remember the contact addresses. Moreover, address books allow for designating a contact as intended recipient of a communication by selecting the contact entry of the contact within a graphical environment presented at a communication device of the user.

Within the graphical environment, many address books provide a presentation of the contacts in a list that is sorted alphabetically. In order to select a contact the user may navigate within the list or he may enter at least part of a name or other contact detail of the contact. Here, contact entries which are highly ranked in the alphabetical order are presented at the beginning of the list and can be accessed easily by the user using relatively few inputs. For accessing contacts which are not ranked highly in the alphabetical order, the user has to scroll the list and/or enter the name of a contact in order to select the contact. For this purpose, significantly more inputs may be required.

It is a problem of the alphabetical order of the contact entries, that contacts which are highly ranked in the alphabetical order are not necessarily the most important contacts for the user, i.e., the contacts the user may wish to select more frequently. Thus, accessing the more relevant contact entries that are used more often may be more involved than accessing less important contact entries. This can be very tedious and unsatisfactory for the user.

In principle, the same problem arises in view of other data items pertaining to contacts of a user, such as messages received from and/or sent to the contacts. Such data items may also be arranged in the alphabetical order of the contacts having sent or received the data items or according to the time of receipt or sending. However, such an arrangement may likewise emphasize data items which are not the most relevant for the user and it may likewise be cumbersome for the user to identify and access important data items.

SUMMARY

Therefore, an exemplary embodiment of the invention provides an arrangement of data items pertaining to contacts which allows for an easier access to the data items which are more relevant or important for a user.

One exemplary embodiment relates to the ordering of contacts in an electronic communication device. More specifically, exemplary embodiments relate to a method and a system for providing an ordered arrangement of data items pertaining to contacts of a user. Moreover, an exemplary embodiment relates to a computer program for executing the method. The data items may be contact entries in an address book or similar contact database of the user or messages of the contacts, for example.

According to one exemplary embodiment, a method for providing an ordered arrangement of data items pertaining to contacts is provided. The order of the arrangement is determined based on a comparison of ranks of the contacts. In the method, communications between the user and the contacts are registered, the communications including active communications originating from the user and terminating at a contact and passive communications originating from a contact and terminating at the user and the rank of a contact is determined based on a comparison of occurrences of the active and the passive communications between the user and the contact.

An exemplary system for providing an ordered arrangement of data items pertaining to contacts is suggested. The order of the arrangement being determined based on a comparison of ranks of the contacts. The exemplary system comprises at least one communication module adapted to register communications between the user and the contacts, the communications including active communications originating from the user and terminating at a contact and passive communications originating from a contact and terminating at the user, and the system further comprises an ordering unit adapted to determine the rank of a contact based on a comparison of occurrences of active and passive communications between the user and the contact.

Data items may be arranged pertaining to the users contacts based on past communication activities between the user and the contacts. It has been discovered that the past communication activities allow for judging which contacts are more relevant to the user and which contacts are less relevant. Moreover, it has been discovered that the "direction" of the communication between the user and a contact, i.e. whether it is the user or the contact who initiates the communication, is an indication of the relevance of the contact. Advantageously, the direction of the communication is assessed by comparing the active and passive communications between the user and the contact.

The rank of a contact may be determined such that it improves with an increasing fraction of the active communications in the communication between the user and the contact. This leads to a lower emphasis of contacts the user communicates with frequently on the initiative of the contacts. Rather, emphasis is put on contacts the user communicates frequently with on his initiative and on contacts to which an essentially mutual relationship exists, i.e. a relationship in which the number of passive communications more or less equals the number of active communications. Usually, such contacts have a higher importance for the user so that they are ranked higher.

In one exemplary embodiment, a first sum of the registered active communications is calculated to determine the occurrences of the active communications and/or a second sum of the registered passive communications is calculated to determine the occurrences of the passive communications.

In another exemplary embodiment, communication is incorporated into the first or second sum with a weight of the communication, the weight being determined based on at least one predefined property of the communication. Using the weights, it may be taken into consideration that different communications may have different relevance for the communication partners, and hence, properties of the registered communications with a contact may be an indication of the degree of relevance of the contact differently.

In one embodiment of the method and the system, the communications between the user and the contacts have at least two communication formats, the weight of the communication being determined based on the format of the communication. Hereby, it is taken into consideration that particularly communications having different communications formats may have different relevance for the user and his communication partner. For instance, the user may assign more relevance to a call with a contact than to a chat message with the contact.

In particular, the user and his contacts may select different communication services for communications of different relevance. Therefore, at least one communication format used for determining the weight of a communication may correspond to a communication service for delivering a part of the communications between the user and his contacts. Examples of different communication services, which are also referred to as communication channels herein, are services for calls, e-mails, Instant Messaging (IM) as well as a Short Message Service (SMS) and a Multimedia Messaging Service (MMS).

The rank of a contact may be determined directly from the result of the comparison of the active and passive communications registered for the contact. However, in a further exemplary embodiment of the method and the system, the rank of a contact is determined based on a parameter, the parameter being calculated based on an occurrence measure for communications registered for the contact and the parameter being modified based on the comparison of the occurrences of the active and the passive communications between the user and the contact. The occurrence measure may be a sum and/or an average of the registered communications, for example.

As for the comparison between the active and passive communications, a communication may be incorporated into the occurrence measure for communications registered for the contact with a weight, the weight being determined based on at least one property of the communication. Also in the occurrence measure, the weighting of the communications takes into consideration the relevance or importance of the communications, which may affect the relevance of the communication partners. For incorporating the weight, the occurrence measure may be determined as a weighted sum or average. Again, the weight may be determined based on a format of the communication, particularly based on the communication service used for delivering the communication.

In addition or as an alternative, the weight of a communication may be determined based on further properties of the communication. Such weighting may be done, when calculating the first sum of the registered active communications and/or the second sum of the registered passive communications in order to compare the active and passive communications registered for a contact. Likewise, such a weighting may be done, when calculating the occurrence measure for communications registered for the contact in order to calculate the aforementioned parameter being modified based on the comparison of the active and the passive communications between the user and the contact.

In one exemplary embodiment, the weight of a registered communication is determined based on a time distance to the registered communication. In particular, this allows defining a relation between the communications registered within a recent short period and the communications with the contact registered in a preceding longer period. Based on the communications registered in the recent short period the current importance of a contact for the user may be determined, and based on communications registered in the preceding longer period the overall importance of a contact over a longer period can be assessed. Whichever information is regarded to be more important, the communications registered in the recent short period or the communications registered in the preceding longer period may be given a greater weight.

It has been discovered that the number of addressees or recipients of certain communication may be an indication of the individual relevance of that communication for the communication partners. In particular, bilateral communications may lead to a closer relationship to a communication partner and hence to a higher importance of the communication partner than multilateral communications. Therefore, in one exemplary embodiment of the method and the system, the weight of a registered communication is determined based on a number of addressees of the communication. Here, the weighting is done in such a way that an increasing number of addressees leads to a smaller weight of the communication.

Furthermore, it has been discovered that the amount of information exchanged with the contact is an indication of the importance of the contact. Particularly, a contact with which the user exchanges a greater amount of information is usually more important for the user. Therefore, in one exemplary embodiment of the method and the system, a weight of a communication is determined based on a duration of the communication and/or an amount of information, particularly an amount of text, delivered in the communication.

In addition to the past communications between the user and a contact, the rank of a contact may also be determined based on one or more additional parameters. In one exemplary embodiment, the rank of a contact is further determined based on a user-defined allocation of the contact to at least one contact group. The contact groups may include groups, such as family, friends and co-workers, to which the user can allocate his contacts, thereby giving an indication of the relevance of the contacts.

Another exemplary embodiment provides that the rank of a contact is determined based on a weighted sum of allocations of the contact to contact groups, each allocation being incorporated into the sum with a weight assigned to the corresponding contact group. Using the weights assigned to the contact groups, the groups can be differentiated according to their relevance for the user.

The communication services used for the communication between user and the contacts may include social network services provided by one or more social network site(s). A social network site may allow its subscribers to subscribe to a feed of another subscriber, in which the other subscriber publishes information. In a further exemplary embodiment, the rank of a contact is determined based on a number of social network sites in which the user has subscribed to a feed of the contact. Hereby, it is taken into consideration that the user does only to subscribe to a feed of a contact, if this contact has a higher relevance for the user.

Moreover, in a social network site the user may allow other subscribers to the social network to access content provided by the user. The content may include pictures, videos and the like, the user wishes to share with others. Access the content may be granted based on access rights specified by the user. It has been observed, that the contacts who are allowed to access more content are usually more relevant for the user. Therefore, in one embodiment of the method and the system, the user provides content to be accessed by other users based on access rights and the rank of a contact is determined based on the content the contact is allowed to access. In particular, the rank of the contact may be determined based on the amount of the content, the contact is allowed to access, or the friction of such content in the overall content provided by the user.

According to an exemplary embodiment, different data items pertaining to the contacts of a user can be ordered. In one exemplary embodiment, the data items are entries in the contact database of the user and/or messages received from and/or sent to the contacts. Such messages may be stored in an archive of received and/or sent messages and similar to the ordering of the contact entries in a contact database, such as an address book, the ordering of such messages likewise facilitates accessing the most relevant or important messages in the archive.

The data items to be ordered may be stored in a communication device, which may also comprise the presentation unit for presenting the data items in the ordered form. In particular, the presentation unit may be an address book application for managing routing information of the contacts.

The ordering unit for determining the ranks of the contacts may be included in the communication device comprising the presentation unit or the ordering unit may be released from the communication device. In this case, the communication device may be connected to the ordering unit through a communication network, for example. The release of the ordering unit from the communication device relives the communication device and its resources from the calculation of the contact's ranks. The determination of the ranks in the communication device does not require an exchange of contact details between the communication device and the communication network and a registration of the past communications of the user in a further unit outside the communication device.

In one exemplary embodiment, the communication device is configured as a mobile communication device, which is usually capable to engage in communications through various communication channels.

According to another exemplary embodiment, a computer program is provided. The computer program comprises software code to perform a method as described herein, when executed on a processor. Moreover, the computer program may be stored on one or more tangible, non-transitory, computer-readable media.

BRIEF DESCRIPTION OF THE DRAWINGS

The aforementioned and other aspects of the invention will be apparent from and elucidated with reference to the embodiments described hereinafter making reference to the accompanying drawings.

FIG. 1 is a block diagram of a communication device providing an arrangement of data items pertaining to its user's contacts according to an exemplary embodiment of the invention; and FIG. 2 is a block diagram of a further communication device providing an arrangement of data items pertaining to its user's according to an exemplary embodiment of the invention.

DETAILED DESCRIPTION OF SPECIFIC EMBODIMENTS

FIG. 1 is a schematic block diagram of a communication device 101. The communication device 101 may be any electronic device that allows its user to engage in communications with other users. The communication device 101 may be a landline communication device such as a computer device or a landline telephone or it may be a mobile device, such as, for example, a mobile phone, a personal digital assistant (PDA), a notebook computer or the like.

Communications between the communication device 101 and the user's communication partners may be performed through one or more communication network(s) 102, 108 to which the communication device 101 can be connected directly or indirectly via one or more further network(s).

In case of a communication device 101 being configured as a mobile device, which is depicted in FIG. 1 for the purpose of example, the communication device 101 may be connectable wirelessly to a mobile communication network 102, thereby allowing communicating with other users of mobile communication devices connected to the mobile communication network 102. Moreover, through the mobile communication network 102, the communication device 101 may be connected to further communication networks so that communications can be performed with communication partners having communication devices connected to these communication networks. One such network, which is also shown in FIG. 1 is a computer network 108, particularly the Internet. A further network to which the communication device 101 may be connected through the mobile communication network 102 and which is not shown in FIG. 1 may be a landline telephone network.

In case the communication device 101 is a landline computer device, it may be connected directly to a computer network 108 and may allow for communicating with communication partners in further communication networks, such as the mobile communication network 102 or a landline telephone network, via the computer network 108.

Furthermore, the communication device 101 may be configured to be connectable to more than one communication network via different access technologies. For instance, a mobile communication device 101 may be connectable to the computer network 108 through a WLAN (Wireless Access Local Area Network) or another intermediate network and not only through the mobile communication network 102.

In addition or as an alternative to a network-based communication, the communication device 101 may also engage in direct communication with another communication device, i.e. not through a network. Such a direct communication may be utilized to exchange use data with the other communication device and may be established, for example, via a wired connection interface, via an infrared (IR) or another optical interface or via a radio interface of the communication device 101.

For communicating with further devices, the communication device 101 depicted in FIG. 1 includes a transceiver module 103, which may include one or more transmitters and receivers for exchanging information with the mobile communication network 102, with another network and/or directly with another communication device. The transceiver module 103 receives communications 104 terminating at the user, which have been initiated by a communication partner of the user of the communication device 101. Such communications 104 are also referred as passive communications herein. For instance, a passive communication 104 may be a message or a call received in the communication device 101. Moreover, the transceiver module 103 may send or initiate communications 105 originating from the user, such as, for example, messages sent from the communication device 101 or calls initiated by the communication device 101. Such communications 104 are also referred to as active communications herein. One active or passive communication corresponds to one communication event or communication activity involving the communication device 101.

Communications in which the communication device 101 is engaged particularly comprise calls and/or messages which may be delivered using at least one communication channel or service. However, as usual especially for mobile communication devices, the communication device 101 may be capable of communicating using a plurality of communication channels. The communication channels correspond to different communication formats. In addition to a single communication channel, different communication formats may be assigned as will be described below.

For each communication channel or service, the communication device 101 may comprise components that facilitate communications via the respective communication channel. These components may be configured as communication modules 106$i$ as schematically depicted in FIG. 1. For the purpose of example, in FIG. 1 the communication modules 106$a$ through 106$g$ are shown. The communication modules 106$i$ are connected to the transceiver module 103 and use the transceiver module 103 to send and receive communications. The communication modules 106$i$ may be configured as software modules which are executed on a (central) processing unit of the communication device 101. Likewise, the communication device 101 may include dedicated hardware providing one or more communication modules 106$i$. Furthermore, at least some of the communication modules 106$i$ may interact with applications in a communication network 102, 108 to which the communication device 101 is connected. In particular, a communication module 106$i$ may be configured to execute a web application provided by a web server in a communication network 102, 108.

Moreover, the communication modules 106$i$ are connected to a user interface 107 of the communication device 101. The user interface 107 may comprise input modules for receiving user inputs, particularly a keyboard for receiving textual input, a microphone for receiving acoustic input and/or a camera unit for receiving optical input. Moreover, the user interface 107 may comprise output module for providing outputs to the user. The output module may include a display device for outputting textual and other visual information and a loudspeaker module for outputting acoustic information. Particularly, via the user interface 107 the user of the communication device 101 particularly controls the communication modules 106$i$ to generate and send communications, the user inputs contents of the communications using the user interface 107, and the communication modules 106$i$ utilize the user interface 107 to present the communications to the user of the communication device 101.

The communications the communication device 101 engages in may include video and/or voice calls through one or more communication network(s) 102, 108. A video and/or voice call service may be based on a circuit switched connection or a packet switched connection, particularly a VoIP connection (VoIP: Voice over IP). To video and/or voice calls, the communication module 106$a$ of the communication device 101 is assigned. The communication module 106$a$ is capable of controlling the execution of calls. In one embodiment, the communication module 106$a$ may also provide a log or history of communication events involving the communication module 106$a$, i.e. calls the user has received and initiated and may also provide a log of calls the user has missed. For each call, the call history may identify the communication partner who may be a contact of the user, and may include further information, such as the date of the call and/or its duration.

In addition or as an alternative, one or more messaging service(s) may be used via the communication device 101. One messaging service may be an e-mail service to which the communication module 106$b$ is assigned. Further messaging services that may be accessed using the communication device 101 may be an SMS (Short Message Service) and an MMS (Multimedia Messaging Service) according to the GSM (Global System for Mobile Communications) and UMTS (Universal Mobile Telecommunications) standard.

The SMS and MMS are particularly provided in the mobile communication network 102 and they are accessed using the communication modules 106$c$ and 106$d$ of the communication device 101. A further messaging service which may be used via the communication device 101 may be an instant messaging (IM) or chatting service. Such a service may be provided through the computer network 108 and to this service the communication module 106$e$ is assigned.

The communication module 106$f$ is assigned to one or more social network (SN) services, which are provided by corresponding provider servers in the computer network 108. A SN service, such as, for example, Facebook, Twitter or Xing, allows its subscribers to communicate via messages, which can be sent from one subscriber to a specific further subscriber or to a group of further subscribers to the SN service. The messages may include user-generated content or may be standardized messages indicating the status of a subscriber, for example. Usually, a SN service is provided through a SN site in the computer network 108 which may be accessed using client software, such as, for example, a web browser, included in the communication module 106$f$. Furthermore, a SN service may allow its users to subscribe to a feed of other users, in which the other users provide information. This allows following the information published by other users. In addition, on or more SN site may allow its subscribers to provide content, such as photos, videos or texts, that other subscribers to the SN site are allowed to access based on access rights specified the publisher of the content. Here, a publisher may allow certain groups of users or certain individual users to access content. This allows a subscriber to a SN site to share content with other users of the SN site.

The communication modules 106$b$ through 106$f$ allow for composing and sending messages as well as for receiving messages and for presenting their content to the user. Moreover, they may store received and/or sent messages in an archive in the communication device 101. As an alternative, one or more communication modules 106$i$ may allow for accessing an archive storing received and/or sent messages provided in a communication network 102, 108. In one embodiment, the archives also serve as logs of communication activities involving the communication modules 106$b$ through 106$f$. In particular, the archives may allow determining the communication partner of the communications involving the communication modules 106$b$ through 106$f$ and further information, such as the date of the communication and/or the length of the included messages.

In view of the IM service, the archive may also be used to identify IM conversations in which the communication partners exchange a plurality of messages. In one embodiment, an IM conversation is determined when the number of messages sent within a predetermined time interval exceeds a predetermined threshold. IM messages whose time distance to another message of the IM conversation is below a predetermined threshold may be regarded as belonging to the IM conversation. In the same way, SN conversations may be identified within the messages the user has exchanged with contacts through a SN service. Since an IM or SN conversation allows for an intense exchange of information in contrast to a single IM or SN message, IM and SN conversations may be regarded as a different communication format then single IM and SN messages.

The communication module 106$g$ is provided for controlling a direct data exchange between the communication device 101 and a further communication device. In such data exchange, particularly pictures, videos and/or music may be transferred from one device to the other, thereby allowing the user to share such data with users of other communication devices. After data have been transferred to the communication device 101 via a direct data exchange, it may be stored therein for future use by a picture viewer of the communication device 101 or a video and/or music player.

It is to be understood that the aforementioned communication services are examples of various communication services that may be accessed using the communication device 101. The communication device 101 can also be used with a selection of the aforementioned communication services and/or may be capable of accessing further communication services which are not explicitly mentioned herein.

Contacts of the user of the communication device 101, i.e. persons the user communicates with and/or whom the user knows how to communicate with, are managed by an address book application 109 of the communication device. The address book application 109, which is referred to as address book herein, may be configured as a software program which is run on a processor unit of the communication device 101, which may be the central processor unit of the communication device 101. The address book 109 includes a database comprising one entry for each contact of the user. The entry of a contact may include an identifier of the contact, such as a name. In addition, the entry of a contact includes addressing or routing information for initiating a communication to the contact using one or more communication services. Thus, a contact entry may include one or more phone numbers of the contact used for voice and/or video calls, the contact's e-mail address, his chatting or IM identification, his identification in one or more SN services and similar details of the contact.

The address book 109 is configured to interact with the communication modules 106i of the communication device and to pass routing information of the contacts to the communication modules 106i, when the user whishes to initiate a communication with a contact. Moreover, the communication modules 106i may access the address book 109 in order to identify contacts from which communications are received. In particular, when a communication, such as a call, only specifies the routing information pertaining to the sender or initiator of the communication, a communication module may retrieve the identification of the contact from the database using the routing information and may present the identification to the user.

The address book 109 is capable of accessing the user interface 107 of the communication device in order to present the contact entries and to allow the user to add, delete and edit contact entries. In the presentation of the contact entries the user may select a contact entry to initiate a communication to the corresponding contact. Upon selection of a contact entry and a communication service to be used to communicate with the contact, the address book 109 may invoke the corresponding communication module 106i and may pass the routing information of the contact, which are relevant for the selected communication service, to the communication module 106i. In addition or as an alternative, the communication modules 106i may invoke the address book 109 in order to allow the user to address an intended communication. Upon invocation of the address book 109, the user may select a contact from the presentation of the contact entries and the routing information of the selected contact, which is relevant for the communication via the communication module 106i, may be passed to the communication module 106i.

The presentation of the contact entries may comprise an ordered arrangement of the identifications of the contacts. Upon selecting a contact entry, the details of the contact including the routing information may be viewed, edited or selected for initiating a communication. If a communication module 106i invokes the address book 109, it may not be necessary to select the relevant routing information, but it may be selected automatically from the available routing information of the contact that has been selected by the user. The arrangement of the identification of the contacts may be a list. For navigating to further contact entries, the user can scroll through the list to select the desired contact and by entering the identification or a contact detail of a contact or part thereof, the user may restrict the contact entries included in the presentation to contacts having an identification or another contact detail including the entered string. As alternative to a list, the contact entries may also be presented in another ordered form. For instance, a perspective pseudo-three-dimensional presentation of the contacts may be provided in which more emphasized contacts appear in the foreground and less emphasized contacts appear in the background. As in the list, the user may likewise scroll through such a presentation and may narrow the presented contacts by entering part of their identification or other contact detail.

The first contact entries in the presented arrangement of the contact entries stored in the address book 109 may be viewed upon accessing the address book 109 so that the user can easily navigate to and select one of the first entries. Therefore, by ordering the contact entries in an appropriate way, the access to entries of the important or relevant contacts can be simplified. If such contact entries are presented at first in the presentation, they can be accessed easily without having to scroll far through the list or enter characters. Thus, it is intended to bring the contact entries into an order that reflects the importance or relevance of the contacts for the user of the communication device 101.

The order in which the contact entries are presented by the address book 109 is determined by an ordering parameter which is calculated in an ordering unit 110 and which is referred to as rank herein. In one embodiment, the ordering unit 110 is a software program that is executed in the communication device 101. Particularly, the ordering unit 110 may be included in the address book application 109. As an alternative, the ordering unit 110 may be configured as a separate application which interacts with the address book 109. In the ordering unit 110, a rank is determined for each contact and forwarded to the address book 109. Using the determined ranks, the address book 109 compares the ranks of the included contacts and generates the presentation of the contacts in such a way that the order of the contacts corresponds to the order of the ranks of the contacts. The contacts may be presented in the descending order of the contacts' ranks, i.e. the contact having the highest rank may be arranged at the beginning and the contact having the lowest rank is arranged at the end of the presentation.

Further data items which are managed and/or accessed via the communication device 101 and which pertain to the contacts of the user of the communication device 101 may also be arranged based on the ranks of the corresponding contacts. Such data items may be messages the user has received from or sent to the contacts or call histories. In particular, the presentation of the archives and/or logs of the communication modules 106a through 106g may be ordered based on the ranks of the contacts. For this purpose, the communication modules 106a through 106g may be connected to the ordering unit 110 and may receive the ranks of the contact from the ordering unit 110.

The ranks of the contacts for which a contact entry is stored in the address book 109 are determined in the ordering unit 110 from the past communication activities involving the communication device 101. Therefore, the ordering unit 110 accesses the histories of past communications that is provided in the communication modules 106a through 106g. As an alternative, the ordering unit 110 may record the communication activities involving the communication device 101 in addition to or in place of the communication modules 106a through 106g.

A rank of a contact is determined in the ordering unit 110 based on a parameter, which is referred to as closeness herein. This rank is referred to as closeness-based rank hereinafter and may correspond to the overall rank of the contact. In principle, the closeness is determined from a comparison of the active communications 105 and the passive communications 105 registered in the communication modules 106a through 106g for the contact within a predetermined time interval. The time interval may include a period between one day and one year before the determination of the closeness, for example, particularly it may be one month.

The closeness-based rank of a contact is determined such that a higher fraction of the active communications 105 in the total communications 104, 105 registered for the user leads to a higher rank of the contact (herein, it is assumed that a higher rank leads to a more emphasized presentation of a data item pertaining to a contact; it may also be possible to calculate the rank such that a lower rank to a more emphasized presentation). On one hand, this leads to a lower emphasis of contacts with whom the user communicates frequently on the initiative of the contacts and which may be referred to as "spammers". On the other hand, the incorporation of the closeness puts emphasis on the contacts with whom the user communicates frequently on his initiative and contacts to which a mutual relationship exists, i.e. a relationship in which the number of passive communications 105 more or less equals the number of active communications 104. Usually, such contacts have a higher importance for the user so that it is advantageous to rank such contacts higher.

In one embodiment, the closeness of a contact is determined as the difference between the number of active communications 105 registered for the contact and the number of passive communications registered for the contact, i.e. as $$C(i)=(A(i)-P(i),$$

where C(i) is the closeness of the contact i, A(i) is the number of active communications 105 registered for the contact i and P(i) is the number of passive communications registered for the contact i. In another embodiment, the difference between the active communications 105 and the passive communications 104 is related to the total number of communications for the contact. Hereby, more emphasis is put on the direction of the communications compared to the number of the communications between the user and a contact. In this embodiment, the closeness for a contact i may be determined as $$C(i)=(A(i)-P(i))/(A(i)+P(i))$$

In both embodiments described before, the closeness-based rank of a contact may correspond to the closeness determined for the contact.

The closeness-based rank determined in the way described before, takes into consideration the communications between the user of the communication device 101 and his contacts via all communication channels supported by the communication device 101. However, the user may be interested in ranks of contacts that are specific for certain communication channel. Therefore, it is likewise possible that the ordering unit 110 determines specific closeness-based ranks of each contact which relate to the different communication channels, respectively or a subset of channels. Considering different SN sites, the ordering unit 110 may also determine a specific closeness-based rank of a contact for certain SN site. Each closeness-based rank may be determined taking into consideration only the active communications 105 and the passive communications 105 delivered using the relevant communication channel. Such rank which is specific to a communication channel or SN site may be used for ordering the archive or history stored in the communication module 106a through 106g pertaining to this communication channel, or it may be used for ordering the contact entries in the address book 109, when the user whishes to select a contact for initiating a communication through the specific communication channel or via the specific SN site. In particular, the address book 109 may be ordered using the channel-specific or SN-specific ranks, when it is invoked by a communication module 106a through 106f.

A further embodiment provides that the closeness of a contact is determined based on weighted sums of the active communications 104 and the passive communications 105. In a weighted sum, each relevant registered communication activity is incorporated with a weight assigned to the communication activity.

If communication activities through various communication formats are considered for determining the closeness-based ranks of the contacts, different weights may be assigned to the communication formats. Hereby, it is taken into consideration that different communication channels may have different relevance for the user and his contacts. The reason for this is that it has been observed that firstly, the user and his contacts select the communication format taking into consideration the importance and complexity of the information to be communicated. For instance, for communicating information of higher importance the user may call the communication partner or send an e-mail message to him rather than send an SMS or an IM message. Secondly, the different communication formats are usually connected with different degrees of familiarity. For instance, a call may lead to a greater familiarity between the communication partners than an e-mail message.

The weights assigned to the communication channels are stored in the ordering unit 110. They may be preconfigured and, in one embodiment, the user may be given the opportunity to change the weights. This allows the user to adjust the weights to his personal preferences of communication. For instance, if the user prefers communication by E-Mail he may assign the highest weights to this communication format, while the pre-configuration may assign the highest weight to calls, which may be the most relevant communication service for the majority of users. In an embodiment, the following weights may be given to the different communication formats:

| Communication Format | Weight |
| --- | --- |
| Calls | 2 |
| SMS | 1.5 |
| MMS | 1.5 |
| Direct data exchange | 1.5 |
| E-Mail | 1 |
| IM conversation | 0.75 |
| SN conversation | 0.75 |
| IM message | 0.25 |
| SN message | 0.25 |

It is to be understood that the aforementioned weights are only given for the purpose of example. Actual preconfigured weights may differ from the weights given before and if the user is enabled to modify the weights, he may specify the weights in a different way according to his personal preferences.

In the ordering unit 110, the weight of the communication channels may be used to calculate weighted sums of the active communications 105 and the passive communications 105 registered for a contact. Each sum comprises the weights of the relevant communications. This means that the weighted sum $\tilde{A}(i)$ of the active communications 105 registered for a contact i is determined as $\tilde{A}(i)=\Sigma_k W_k(i, \text{active})$, where the $W_k(i, \text{active})$ are the active communications 105 registered for the contact i in the relevant time period. Similarly, the weighted sum $\tilde{P}(i)$ of the passive communications 104 registered for a contact i is determined as $\tilde{P}(i)=\Sigma_k W_k(i, \text{passive})$, where the $W_k(i, \text{passive})$ are the passive communications 105 registered for the contact i in the relevant time period.

Taking into consideration the weighted sums described before, the closeness of a contact may be calculated based on the difference between the weighted sums of the active communications 104 and the passive communications 105. In particular, the closeness may be calculated as $$C(i)=\tilde{A}(i)-\tilde{P}(i) \text{ or as}$$

$$C(i)=(\tilde{A}(i)-\tilde{P}(i))/(\tilde{A}(i)+\tilde{P}(i))$$

As described before, in this embodiment, the closeness of a contact may also be used as the closeness-based rank of the contact.

In further embodiments, further parameters are incorporated, when the ordering unit 110 determines the closeness-based rank of a contact. In particular, the rank of a contact may be determined based on the number of communication activities registered for the contact in addition to the closeness of the contact. Here, the closeness may be a factor weighting an occurrence measure for the registered communications with the contact within the rank to be determined. In particular, the closeness-based rank may include a factor $R_W(i)$, and may be calculated as $$R_W(i) \cdot (1+a \cdot C(i)),$$

where the parameter a is a predetermined factor for weighting the closeness $C(i)$. The factor $R_W(i)$ represents the occurrence measure for the registered communications between the user and the contact i, which is a measure for the occurrence of communication activities involving the user and the contact. The occurrence measure may be determined as a sum and/or an average, for example.

The closeness may be determined according to one of the embodiments described before. Particularly, the closeness may be calculated by summing the unweighted communications. However, the closeness may also be determined based on the weighted sums described before. The occurrence measure $R_W(i)$ is not multiplied with the closeness directly, but with a factor $1+C(i)$, in order to ensure that a rank which is not zero can be determined if the closeness of the contact is zero (because the number of active communications equals the number of passive communications, for example).

In principle, the occurrence measure for the communication with a contact as it is determined in the ordering unit 110 is based on the frequency of the communications between the user of the communication device 101 and the contact in the relevant time period. Here, a higher frequency leads to a higher rank of the contact, since the contacts with whom the user communicates more frequently are usually more relevant for the user. However, as described before, communications using different communication formats usually have different relevance for the user and his contacts. Therefore, if multiple communication channels are taken into consideration, when determining the rank of the contact, the communications are incorporated into the occurrence measure with a weight assigned to the communication format used in the communication activity. The used weights may be the same weights which are described above in connection with the determination of the closeness of the contact.

In one embodiment, the occurrence measure calculated as the weighted sum of the communication activities registered for the contacts within a predetermined time period, i.e. as $R_W(i)=\Sigma_k W_k(i)$, where $W_k(i)$ is the weight of a communication activity k and where the sum includes the weights of the communication activities which have been performed within the relevant time period. Likewise, a weighted average may be calculated.

In further embodiments, registered communications may be weighted according to the recency of the communications. This weighting may be done in addition to the weighting according the formats of the communications, i.e. a communication is weighted with the weight assigned to the time period of the communication in addition to the weighting according to the communication channel used. In this case, a communication may be weighted using the product of both weights, for example. However, the recency-based weighting may also be done as an alternative to the format-based weighting, particularly when the rank of a contact is to be determined for a single communication channel.

There may be defined two or more time periods and to each time period an individual weight is assigned. In one embodiment, at least two time periods are used, one of the time periods may be relative short and the other time period may be longer and may precede the shorter time period. By using the short time period, which may include the past week or fewer days, for example, the recent communication behavior of the user and his contacts is accessed. Using a longer time period, the long-term communication behavior of the user and his contacts can be accessed. Usually, this long-term behavior has a higher impact on the importance of a contact. Therefore, to the longer time period a higher weight may be assigned than to the shorter and more recent time period. Between the first short time period and the second longer time period an intermediate time period may be provided, to which a lower weight may be assigned than to the first short time period. This allows stressing the most recent communication activities falling into the first short time period.

An exemplary embodiment provides that communications within the past month are considered and that three time periods are used to which weights are assigned: To the past day, a weight WDay may be assigned, to the past week (excluding the past day) a weight WWeek and to the past month (excluding the past week) a weight WMonth. For instance, the weights may be WMonth=1, WWeek=0.2 and WDay=0.25. Using these weights, the occurrence measure for the communications with a contact may again be the weighted sum of the communications in the relevant time period and this weighted sum may be calculated as:

$$R_W(i) = W_{Day}\sum_{k=n} W_k(i) + W_{Week}\sum_{k=n-1}^{n-7} W_k(i) + W_{Month}\sum_{k=n-8}^{n-30} W_k(i)$$

In this formula, for the different sums it is indicated for which days the communications are incorporated. Here, n is the actual day and, correspondingly, the sum from n−1 to n−7 incorporates the communications of the past week excluding the past day.

Referring to the closeness of a contact again, the active communication 105 and the passive communications 104 may also be weighted according to their recency in the way described before, when calculating the closeness. This is particular useful, when the closeness-based rank of the contact corresponds to the closeness of the contact. It may also be done, when a communications sum is calculated for the contact. In this case, different weights may be assigned to the time periods when calculating the closeness and the communications sum.

In addition or as an alternative to the weighting of the communications in accordance with their recency, communications may be weighted according to further factors when determining the communications sum and/or the closeness of the user's contacts. One such factor may be the duration or length of a communication. By these factors, the amount of information delivered in a communication can be considered in the determination of the ranks of the contacts. In particular, it can be considered that a contact with whom a greater amount of information is exchanged may be more relevant or important for the user. To a call a weight may be assigned according to the duration of the call and the weight may increase with the duration of a call. In an exemplary embodiment, the weight may increase stepwise. A message may be given a weight in accordance with the number of characters or words included therein and to an IM or SN conversation a weight may be assigned in accordance with the number of messages included in the conversation. Similar to the call, the weight of a message may increase with an increasing number of characters or words and the weight assigned to an IM or SN conversation may increase with an increasing number of messages included in the conversation. The aforementioned weights may be again increased in steps with an increasing number of characters or words and number of messages.

In addition or as an alternative, the communications may be weighted according to the number addressees of the communication. Here, the weighting is done in such a way that an increasing number of addressees leads to a smaller weight of the communication. Particularly for messages it is possible to send them to a plurality of recipients. However, such "mass mails" are not capable of establishing a closer relationship between the user and a contact as bilateral communication does. Hence, bilateral communications are an indication of a closer relationship and higher relevance or importance of a contact.

Furthermore, the rank of a contact may be composed of further parameters in addition to the closeness-based rank described before. The closeness-based rank allows for determining the relevance or importance of a contact of a user based on the past communication activities of involving the user and the contact. A further parameter, which is referred to as group-based rank hereinafter, may be determined based on a membership of a contact in at least one group. The group or a plurality of contact groups may be predefined, or they may be defined by the user. Possible contact groups include family, friends, colleagues and the like. To each group a weight may be assigned, which may be specified by the user or which may be predefined in the ordering unit 110. The allocation of contacts to groups may be established by the user using the address book 109 of the communication device 101 which may provide the possibility to specify a group membership as one contact detail in the contact entries.

When determining the rank of a contact, the group based rank may be determined by summing the weights of the groups the contact is a member of. The rank of the contact may be determined as the sum of the closeness-based rank and the group-based rank. Thus, a contact that is a member of a group to which a high weight is assigned may have a high rank although few communication activities have been registered involving the contact. This allows the user to ensure that members of important groups have a high rank in the ordered presentation of the contact and that access to the contact entries of such contacts is simplified.

A further parameter which can be included when calculating the rank of a contact may be a connection-based rank. The connection-based rank of a contact may be determined based on the number of social network sites through which the user and a contact are connected. These may be the social network sites in which the user has subscribed to the feed of the contact or the number of social network sites in which the user and the contact have subscribed to the feeds of each other. Hereby, it is taken into consideration that the user does only to subscribe to a feed of a contact, if this contact has a higher relevance for the user.

A further rank of a contact may be determined based on the content the user shares with the contact through one or more SN site(s). Hereby, it can be taken into consideration that a contact with whom the user shares more content is usually more important for the user. The content shared with a contact is the content to which the contact has the right to access. Therefore, the aforementioned rank is determined based on the access rights specified by the user for the access to content to be shared via one or more SN site. In particular, the rank may be determined based on fraction of the content that can be accessed by the contact in the overall content that user shares with other users of SN sites.

The overall rank of contact may be determined based on the closeness-based rank and one or more of the aforementioned further ranks. In particular, the overall rank may be the sum of the considered. Here, each rank that is incorporated into the overall rank of a contact may be incorporated with a weighting factor which may be preconfigured or which may be defined by the user. In the latter case, the user is enabled to adjust the influence of the connection-based and the group-based rank.

According to one of the aforementioned embodiments, the ordering unit 110 may determine the ranks of the communication contacts of the user regularly. Each time, updated ranks of the contacts are determined reflecting changes in the communication behavior of the user and his contacts. The past ranks of the contacts may be stored in the communication device 101 and the ordering unit 110 may provide functionality to visualize the developing of the ranks of individual contacts or a comparison of the developing of the ranks of several selected contacts. This allows the user to reconstruct changes of his communication behavior and in his social relationships.

The embodiment schematically depicted in FIG. 2 differs from the embodiment described before with reference to FIG. 1 in that the ordering unit 110 is not arranged in the communication device 101 but in a communication network to which the communication device 101 is connected. In particular, FIG. 2 shows an embodiment in which the communication device 101 is configured as a mobile communication device and the ordering unit 110 is integrated into a server unit of the mobile communication network 102 the mobile communication device is connected to. However, it is likewise possible to provide an ordering unit 110 in the computer network 108. As depicted in FIG. 2, the communication device 101 and the ordering unit 110 may communication through the transceiver module 103 (which is also configured to receive passive communications 105 and to send active communications 104, although theses communications are not shown in FIG. 2).

When the ordering unit 110 is operated in the mobile communication network 102, the communications 104 originating from the user and the communications 105 terminating at the user may be established via the ordering unit 110 and the ordering unit 110 may register the communications. As an alternative the ordering unit 110 may receive notifications of communication activities involving the communication device 101 from other network entities and/or from the communication device 101 in order to register such communications.

Moreover, the ordering unit 110 in the mobile communication network 102 may receive from the communication device 101 at least part of the information stored in the address book 109 of the communication device 101 including the routing information of the contacts and optionally the allocation of the contacts to existing contact groups. Since this information may change in time, it may be updated regularly.

Using the aforementioned information, the ordering unit 110 in the mobile communication network 110 may determine the ranks of the contacts of the user in the same way as the ordering unit 110 which is integrated into the communication device 101. When the ordering unit 110 has calculated the ranks of the contacts, it may communicate the ranks to the communication device 101. In the communication device, the address book 109 and/or the communication modules 106a through 106b may use the received ranks for sorting the contact entries or other data items pertaining to the user's contacts in the way already described before.

The arrangement of the ordering unit 110 within a communication network 102, 108 relives the communication device 101 and its resources from the calculation of the contact's ranks. The determination of the ranks in the communication device does not require an exchange of contact details between the communication device 101 and the communication network 102, 108 and a registration of the communication activities involving the communication device 101 in the communication network 102, 108.

The calculation of the ranks of the contacts may be done for different users and/or in different communication devices 101 using the same algorithm. However, in one embodiment different algorithm for calculating the ranks of contacts may be provided. In this embodiment, an algorithm may be allocated to a user based on a selection by the user or it may be selected automatically for a user.

While the invention has been illustrated and described in detail in the drawings and foregoing description, such illustration and description are to be considered illustrative or exemplary and not restrictive; the invention is not limited to the disclosed exemplary embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. A method for providing an ordered arrangement of data items pertaining to contacts, the order of the arrangement being determined based on a comparison of ranks of the contacts, the method comprising:

registering communications between the user and the contacts, the communications including active communications originating from the user and terminating at a contact and passive communications originating from a contact and terminating at the user; and determining a rank of a contact based on a parameter, the parameter being calculated based on an occurrence measure for the communications registered for the contact which is based on a frequency of the communications between the user and the contact in a relevant time period and the parameter being modified based on a comparison of occurrences of the active and the passive communications between the user and the contact, the comparison being based on a difference between a number of active communications and a number of passive communications such that a higher frequency of communications between the user and the contact in the relevant time period leads to a higher rank of the contact if the number of active communications equals the number of passive communications.

2. The method recited in claim 1, wherein the rank of a contact is determined such that it increases with an increasing fraction of the active communications in the communication between the user and the contact.

3. The method recited in claim 1, wherein a first sum of the registered active communications is calculated to determine the occurrences of the active communications and/or a second sum of the registered passive communications is calculated to determine the occurrences of the passive communications.

4. The method recited in claim 3, wherein a communication is incorporated into the first or second sum with a weight of the communication, the weight being determined based on at least one predefined property of the communication.

5. The method recited in claim 3, wherein the communications between the user and the contacts have at least two communication formats, a weight of the communication being determined based on the format of the communication.

6. The method recited in claim 5, wherein at least one communication format corresponds to a communication service for delivering a part of the communications between the user and the contacts.

7. The method recited in claim 1, wherein a weight of the communication is determined based on a number of addressees of the communication.

8. The method recited in claim 1, wherein the rank of a contact is further determined based on a user-defined allocation of the contact to at least one contact group.

9. The method recited in claim 1, wherein the rank of a contact is determined based on a number of social network sites in which the user has subscribed to a feed of the contact.

10. The method recited in claim 1, wherein the user provides content to be accessed by other users based on access rights and the rank of a contact is determined based on the content the contact is allowed to access.

11. The method recited in claim 1, wherein the data items are entries in a contact database and/or messages received from and/or sent to the contacts.

12. One or more tangible, non-transitory, computer-readable storage media, comprising code that provides an ordered arrangement of data items pertaining to contacts, the order of the arrangement being determined based on a comparison of ranks of the contacts, the code configured to direct a processor to:

register communications between the user and the contacts, the communications including active communications originating from the user and terminating at a contact and passive communications originating from a contact and terminating at the user; and determine a rank of a contact based on a parameter, the parameter being calculated based on an occurrence measure for the communications registered for the contact which is based on a frequency of the communications between the user and the contact in a relevant time period and the parameter being modified based on a comparison of occurrences of the active and the passive communications between the user and the contact, the comparison being based on a difference between a number of active communications and a number of passive communications such that a higher frequency of communications between the user and the contact in the relevant time period leads to a higher rank of the contact if the number of active communications equals the number of passive communications.

13. A system for providing an ordered arrangement of data items pertaining to contacts, the order of the arrangement being determined based on a comparison of ranks of the contacts, the system comprising at least one processing unit, the processing unit being adapted to perform a function of at least one communication module:

the at least one communication module being adapted to register communications between the user and the contacts, the communications including active communications originating from the user and terminating at a contact and passive communications originating from a contact and terminating at the user; and the system further comprising:

an ordering unit adapted to determine the rank of a contact based on a parameter, the parameter being calculated based on an occurrence measure for the communications registered for the contact which is based on a frequency of the communications between the user and the contact in a relevant time period and the parameter being modified based on a comparison of occurrences of active and passive communications between the user and the contact, the comparison being based on a difference between a number of active communications and a number of passive communications such that a higher frequency of communications between the user and the contact in the relevant time period leads to a higher rank of the contact if the number of active communications equals the number of passive communications.

14. The system recited in claim 13, wherein the presentation unit and the ordering unit are included in one device or wherein the presentation unit is connectable to the ordering unit through a communication network.

* * * * *